United States Patent
Inoue et al.

(10) Patent No.: US 8,642,686 B2
(45) Date of Patent: Feb. 4, 2014

(54) PASTE COMPOSITION AND PRINTED CIRCUIT BOARD

(75) Inventors: Shinichi Inoue, Ibaraki (JP); Hiroyuki Hanazono, Ibaraki (JP); Hirofumi Ebe, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 183 days.

(21) Appl. No.: 13/221,212

(22) Filed: Aug. 30, 2011

(65) Prior Publication Data

US 2012/0061126 A1 Mar. 15, 2012

(30) Foreign Application Priority Data

Sep. 15, 2010 (JP) ................................. 2010-206327
Jan. 19, 2011 (JP) ................................. 2011-009258

(51) Int. Cl.
C08K 3/00 (2006.01)
C08K 3/04 (2006.01)
C08K 3/10 (2006.01)
C08K 5/34 (2006.01)
C08K 5/3445 (2006.01)

(52) U.S. Cl.
USPC ........... 524/106; 524/403; 524/406; 524/424; 174/251; 252/500; 252/511; 252/514; 977/932

(58) Field of Classification Search
USPC .................. 524/106, 403, 406, 424; 174/251; 252/500, 511, 514; 977/932
See application file for complete search history.

(56) References Cited

U.S. PATENT DOCUMENTS

| | | | |
|---|---|---|---|
| 2002/0192460 A1* | 12/2002 | Kawaguchi et al. | .......... 428/341 |
| 2004/0131907 A1 | 7/2004 | Arita et al. | |
| 2008/0261086 A1 | 10/2008 | Sueyoshi et al. | |
| 2008/0283282 A1* | 11/2008 | Kawasaki et al. | ............. 174/258 |
| 2010/0137174 A1 | 6/2010 | Maeda et al. | |
| 2012/0138868 A1* | 6/2012 | Arifuku et al. | ................ 252/510 |

FOREIGN PATENT DOCUMENTS

| | | |
|---|---|---|
| EP | 1253813 A1 | 10/2002 |
| EP | 1986260 A1 | 10/2008 |
| EP | 2159274 A1 | 3/2010 |
| JP | 2004-018554 A | 1/2004 |
| JP | 2004-200064 A | 7/2004 |
| JP | 2009123441 A | 6/2009 |

OTHER PUBLICATIONS

Office Action issued Sep. 12, 2012 in EP Application No. 11 177 701.7.
EP Search Report issued Jan. 30, 2012 in EP Application No. 11177701.7.

* cited by examiner

*Primary Examiner* — Kriellion Sanders
(74) *Attorney, Agent, or Firm* — Panitch Schwarze Belisario & Nadel LLP

(57) ABSTRACT

A conductor layer is formed on one surface of a base insulating layer. The conductor layer is composed of a pair of rectangular collector portions and drawn-out conductor portions extending in long-sized shapes from the collector portions, respectively. Cover layers are formed on the base insulating layer to cover respective given portions of the conductor layer. A paste composition containing a compound represented by the formula (1) is used as a material for the cover layer.

[Formula 1]

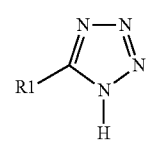

(1)

5 Claims, 6 Drawing Sheets

F I G. 6
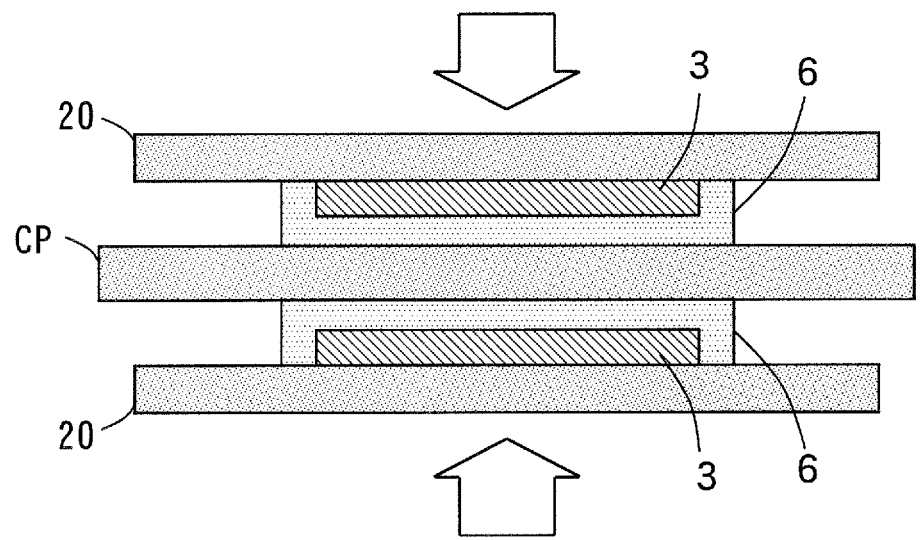

PASTE COMPOSITION AND PRINTED CIRCUIT BOARD

BACKGROUND OF THE INVENTION

1. Field of the Invention

The present invention relates to a paste composition and a printed circuit board using the same.

2. Description of the Background Art

Batteries that are small in size and have high capacity are desired for mobile equipment such as cellular telephones. Therefore, fuel cells capable of providing higher energy density than conventional batteries such as lithium secondary batteries have been developed. Examples of the fuel cells include a direct methanol fuel cell.

In the direct methanol fuel cell, methanol is decomposed by a catalyst, forming hydrogen ions. The hydrogen ions are reacted with oxygen in the air to generate electrical power. In this case, chemical energy can be converted into electrical energy with extremely high efficiency, so that significantly high energy density can be obtained.

A flexible printed circuit board (hereinafter abbreviated as an FPC board), for example, is provided as a collector circuit within such a direct methanol fuel cell (see JP 2004-200064 A, for example).

The FPC board has a configuration in which a conductor layer is formed on a base insulating layer having flexibility. A part of the FPC board is drawn out of the fuel cell. Various external circuits are connected to the part of the FPC board that is drawn out of the fuel cell.

When methanol supplied as a fuel to the direct methanol fuel cell reacts with oxygen, formic acid having a strong corrosive effect is formed. The formic acid causes the conductor layer of the FPC board to corrode.

BRIEF SUMMARY OF THE INVENTION

An object of the present invention is to provide a paste composition capable of inhibiting a conductor layer from corroding due to formic acid, and a printed circuit board using the same.

(1) According to an aspect of the present invention, a paste composition contains a thermosetting polymer, and a compound represented by the following formula (1) where R1 is a hydrogen atom, an alkyl group with carbon number 1 to 14, a phenyl group, an amino group, a mercapto group, an aromatic series-containing functional group, an alkoxy group, an alkylamino group or an alkoxycarbonyl group.

[Formula 1]

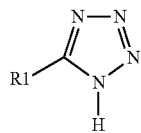

(1)

The paste composition contains the compound represented by the foregoing formula (1). Therefore, when the paste composition is used as a material for a cover layer covering a conductor layer, the conductor layer is inhibited from corroding due to formic acid even though the formic acid is in contact with the cover layer.

(2) The paste composition may further contain a conductive material. In this case, conductivity of the paste composition is ensured. Thus, when the paste composition is used as the material for the cover layer covering the conductor layer, electricity can be conducted between the conductor layer and another element through the cover layer while the conductor layer is inhibited from corroding due to formic acid.

(3) The conductive material may contain at least one of carbon black, graphite, carbon nanotube, carbon fiber, gold and silver. In this case, carbon black, graphite, carbon nanotube, carbon fiber, gold and silver are comparatively inexpensive and have low electric resistance. Thus, manufacturing cost can be decreased and conductivity of the paste composition can be sufficiently ensured.

(4) A ratio of the compound may be not less than 0.01 part by weight and not more than 10 parts by weight when the compound, the thermosetting polymer and the conductive material are 100 parts by weight in total. When the paste composition is used as the material for the cover layer covering the conductor layer, electricity can be conducted between the conductor layer and another element through the cover layer while the conductor layer is sufficiently inhibited from corroding due to formic acid.

(5) The thermosetting polymer may contain at least one of phenolic resin, epoxy resin and polyester resin. In this case, since phenolic resin, epoxy resin and polyesther resin are comparatively inexpensive, manufacturing cost can be decreased.

(6) According to another aspect of the present invention, a printed circuit board includes an insulating layer, a conductor layer provided on the insulating layer and having a given pattern, and a cover layer formed to cover at least part of the conductor layer, wherein the cover layer contains the paste composition according to the one aspect of the present invention.

In the printed circuit board, the conductor layer having the given pattern is formed on the insulating layer, and the cover layer is formed to cover the at least part of the conductor layer. In this case, since the cover layer contains the paste composition according to the one aspect of the present invention, the conductor layer is inhibited from corroding due to formic acid even though the formic acid is in contact with the cover layer.

According to the present invention, the conductor layer is inhibited from corroding due to formic acid even though the formic acid is in contact with the cover layer.

Other features, elements, characteristics, and advantages of the present invention will become more apparent from the following description of preferred embodiments of the present invention with reference to the attached drawings.

BRIEF DESCRIPTION OF THE SEVERAL VIEWS OF THE DRAWINGS

FIG. 6 is a schematic diagram showing a method of measuring contact resistance.

DETAILED DESCRIPTION OF THE INVENTION

Figure 1:
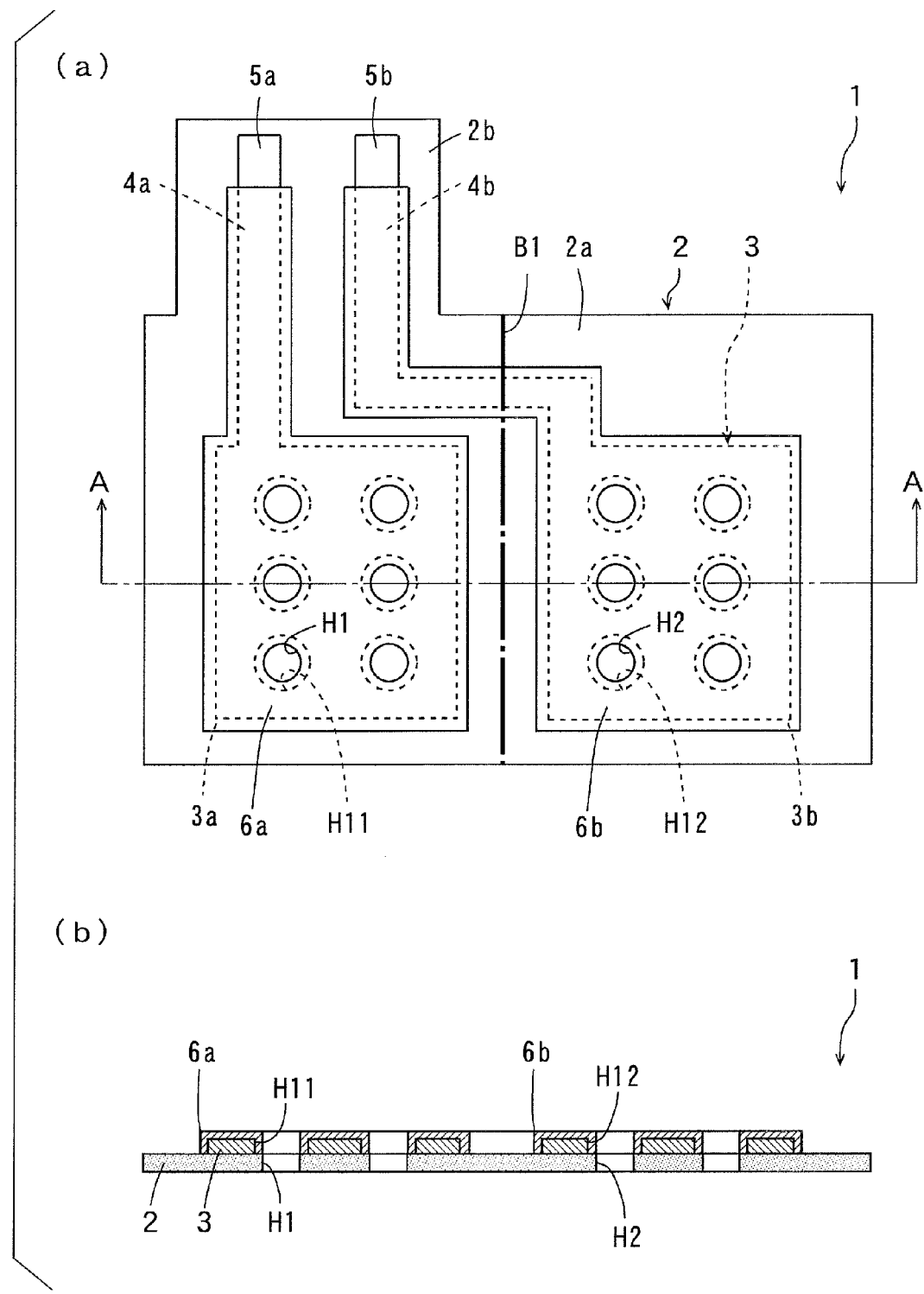
FIGS. 1 (a), (b) are diagrams showing the configuration of a flexible printed circuit board according to the present embodiment.

Description will be made of a paste composition and a printed circuit board according to one embodiment of the present invention while referring to the drawings. Note that description will be made of a flexible printed circuit board to be used in a fuel cell as an example of the printed circuit board in the present embodiment.

(1) Configuration of the Flexible Printed Circuit Board

FIG. 1 (a) is a plan view of the flexible printed circuit board according to the present embodiment, and FIG. 1 (b) is a sectional view of the flexible printed circuit board taken along the line A-A of FIG. 1 (a). In the following description, the flexible printed circuit board is abbreviated as the FPC board.

As shown in FIGS. 1 (a) and (b), the FPC board 1 includes a base insulating layer 2. The base insulating layer 2 is composed of a rectangular first insulating portion 2a, and a second insulating portion 2b outwardly extending from one side of the first insulating portion 2a. In the following description, the above-mentioned one side and another one side parallel thereto of the first insulating portion 2a are referred to as lateral sides, and another pair of sides perpendicular to the lateral sides of the first insulating portion 2a is referred to as end sides.

A bend portion B1 is provided in the first insulating portion 2a of the base insulating layer 2 so as to be parallel to the end sides and to divide the first insulating portion 2a into two substantially equal parts. As will be described below, the first insulating portion 2a is bent along the bend portion B1. The bend portion B1 may be a shallow groove having a line shape, a mark having a line shape or the like, for example. Alternatively, there may be nothing at the bend portion B1 if the first insulating portion 2a can be bent at the bend portion B1. The second insulating portion 2b is formed to outwardly extend from the lateral side of one region of the first insulating portion 2a with the bend portion B1 as a boundary.

A plurality of (six in this example) openings H1 are formed in the one region of the first insulating portion 2a with the bend portion B1 as the boundary. A plurality of (six in this example) openings H2 are formed in the other region of the first insulating portion 2a with the bend portion B1 as the boundary.

A conductor layer 3 is formed on one surface of the base insulating layer 2. The conductor layer 3 is composed of a pair of rectangular collector portions 3a, 3b and drawn-out conductor portions 4a, 4b extending in long-sized shapes from the collector portions 3a, 3b, respectively.

Each of the collector portions 3a, 3b has a pair of lateral sides parallel to the lateral sides of the first insulating portion 2a and a pair of end sides parallel to the end sides of the first insulating portion 2a. With the bend portion B1 as the boundary, the collector portion 3a is formed in the one region of the first insulating portion 2a, and the collector portion 3b is formed in the other region of the first insulating portion 2a.

Openings H11 each having a larger diameter than that of the opening H1 are formed in respective portions, above the openings H1 of the base insulating layer 2, of the collector portion 3a. Openings H12 each having a larger diameter than that of the opening H2 are formed in respective portions, above the openings H2 of the base insulating layer 2, of the collector portion 3b.

The drawn-out conductor portion 4a is formed to linearly extend from the lateral side of the collector portion 3a to a region on the second insulating portion 2b. The drawn-out conductor portion 4b is formed to extend from the lateral side of the collector portion 3b and bend to a region on the second insulating portion 2b.

Cover layers 6a, 6b are formed on the base insulating layer 2 to cover respective given portions of the conductor layer 3. The cover layer 6a is formed on the insulating layer 2 to cover the collector portion 3a and a portion of the drawn-out conductor portion 4a excluding its tip, and the cover layer 6b is formed on the insulating layer 2 to cover the collector portion 3b and a portion of the drawn-out conductor portion 4b excluding its tip. The tips of the drawn-out conductor portions 4a, 4b that are not covered with the cover layers 6a, 6b to be exposed are referred to as drawn-out electrodes 5a, 5b in the following description. The cover layer 6a is in contact with an upper surface of the base insulating layer 2 within the openings H11 of the collector portion 3a. The cover layer 6b is in contact with the upper surface of the base insulating layer 2 within the openings H12 of the collector portion 3b.

The cover layers 6a, 6b are each made of a paste composition described below. The paste composition contains a resin material and a conductive material. A thermosetting polymer such as phenolic resin, epoxy resin, acrylic resin, polyurethane resin, polyimide resin or polyester resin is used as the resin material. One of the foregoing resin materials may be individually used or a plurality of kinds of foregoing resin materials may be mixed to be used. Particularly, the phenolic resin, the epoxy resin or the polyester resin is preferably used. An inorganic material such as gold, silver, silver nanoparticles, carbon black, graphite, carbon nanotube and carbon fiber or a conductive polymer such as polythiophene and polyaniline, for example, is used as the conductive material. One of the foregoing conductive materials may be individually used, or a plurality of kinds of foregoing conductive materials may be mixed to be used.

The paste composition contains a compound (hereinafter referred to as an added compound) represented by the formula (1). In the formula (1), R1 is a hydrogen atom, an alkyl group with C1 to C14 (carbon number 1 to 14), a phenyl group, an amino group, a mercapto group, an aromatic series-containing functional group, an alkoxy group, an alkylamino group or an alkoxycarbonyl group.

[Formula 2]

Examples of the added compound represented by the formula (1) include 1H-tetrazole, 5-amino-1H-tetrazole, 5-methyl-1H-tetrazole or 5-phenyl-1H-tetrazole. Particularly, 5-methyl-1H-tetrazole or 5-phenyl-1H-tetrazole is preferably used.

A ratio of the added compound to the paste composition is adjusted such that the cover layers 6a, 6b are prevented from corroding due to formic acid. More specifically, when it is assumed that the resin material, the conductive material and the added compound are 100 parts by weight in total, the added compound is preferably not less than 0.01 part by weight and not more than 10 parts by weight, and more preferably not less than 0.14 part by weight and not more than 9 parts by weight.

(2) Method of Manufacturing the FPC Board

Figure 2:
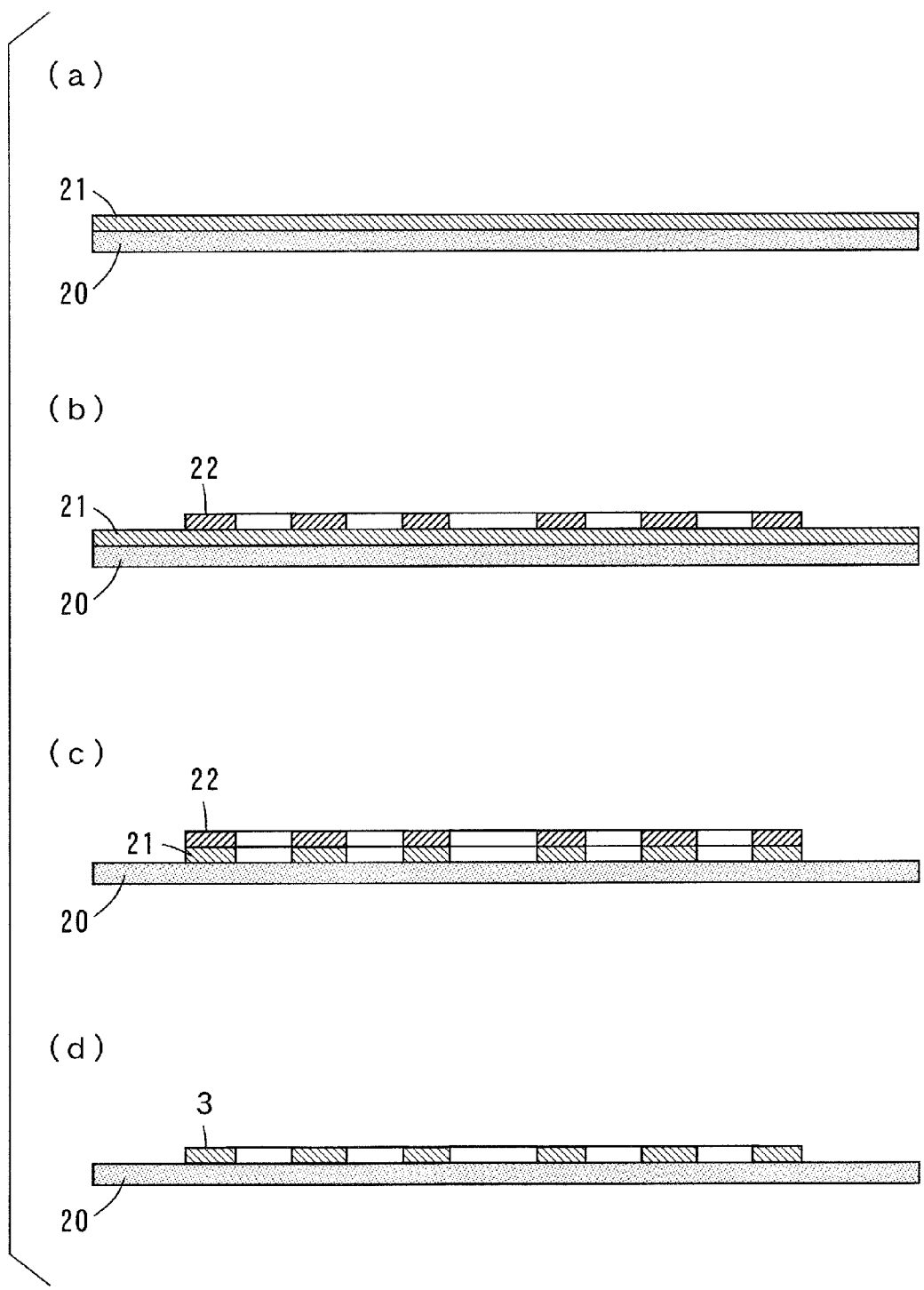
FIGS. 2 (a) to (d) are sectional views for use in illustrating steps in a method of manufacturing the flexible printed circuit board.
Figure 3:
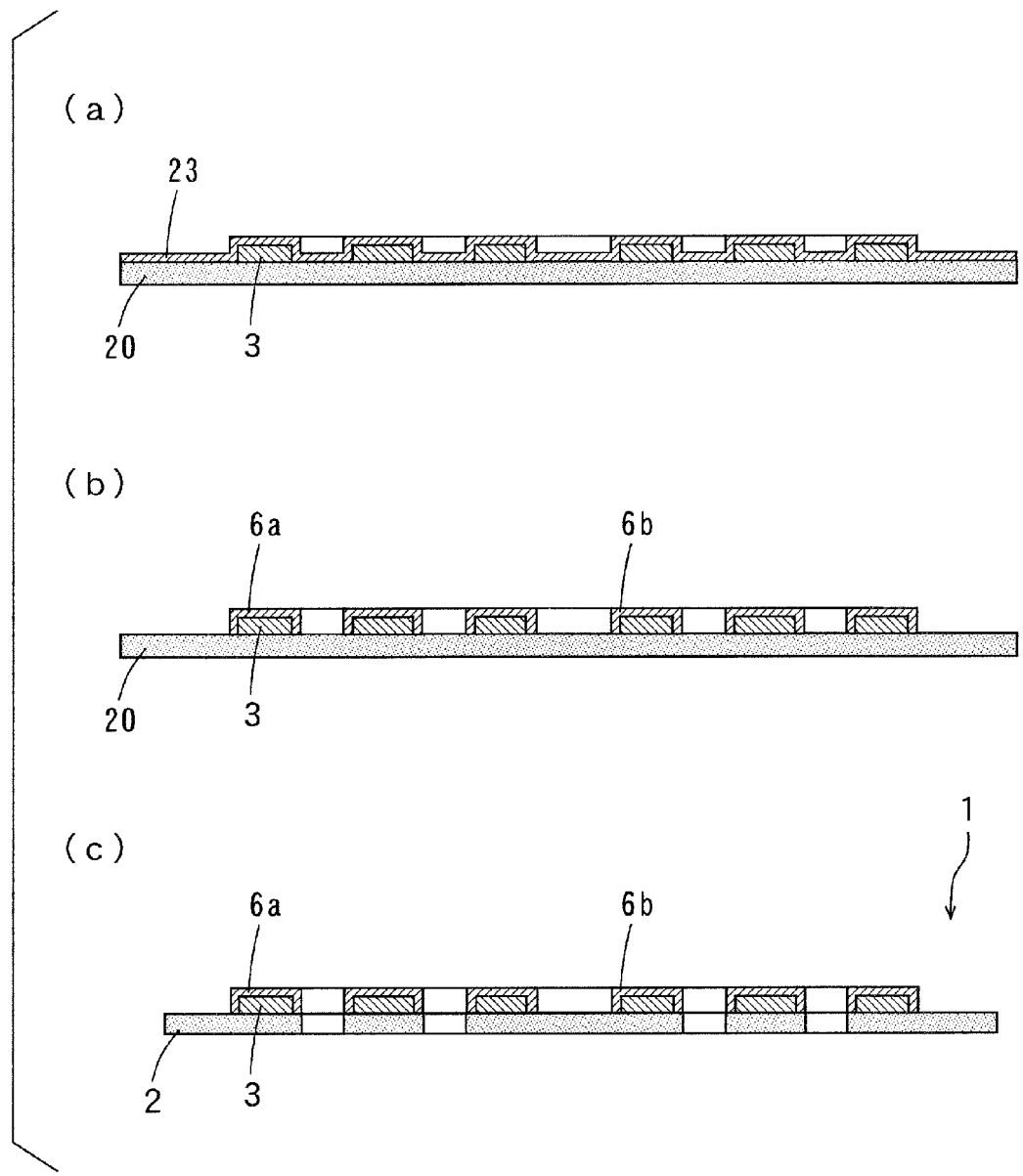
FIGS. 3 (a) to (c) are sectional views for use in illustrating steps in the method of manufacturing the flexible printed circuit board.

Next, description will be made of a method of manufacturing the FPC board 1 shown in FIG. 1. FIGS. 2 and 3 are sectional views for use in illustrating steps in the method of manufacturing the FPC board 1.

First, an insulating layer 20 made of polyimide, for example, and a conductor layer 21 made of copper, for example, are laminated to each other, forming a two-layer base material as shown in FIG. 2 (*a*). The thickness of the insulating layer 20 is preferably not less than 1 μm and not more than 100 μm. The insulating layer 20 having the thickness of not less than 1 μm causes the FPC board 1 to be easily handled. The insulating layer 20 having the thickness of not more than 100 μm ensures flexibility of the FPC board 1 and does not prevent the FPC board 1 from being reduced in size. The thickness of the insulating layer 20 is more preferably not less than 5 μm and not more than 50 μm, and further preferably not less than 5 μm and not more than 30 μm. The thickness of the conductor layer 21 is not less than 3 μm and not more than 35 μm, and more preferably not less than 5 μm and not more than 20 μm.

Then, an etching resist 22 having a given pattern is formed on the conductor layer 21 as shown in FIG. 2 (*b*). The etching resist 22 is formed by forming a resist layer on the conductor layer 21 using a dry film resist or the like, exposing the resist layer in the given pattern, and then developing the resist layer, for example.

As shown in FIG. 2 (*c*), a region of the conductor layer 21 excluding a region below the etching resist 22 is subsequently removed by etching using ferric chloride, for example. Then, the etching resist 22 is removed by a stripping solution as shown in FIG. 2 (*d*). Accordingly, the conductor layer 3 is formed on the insulating layer 20.

Next, the paste composition containing the foregoing conductive material, resin material and added compound is applied on the conductor layer 3 and the insulating layer 20, thereby forming a cover layer 23 as shown in FIG. 3 (*a*). The thickness of the cover layer 23 is preferably not less than 5 μm and not more than 25 μm, and more preferably not less than 10 μm and not more than 20 μm.

The cover layer 23 is exposed in a given pattern, followed by development, thereby forming the cover layers 6*a*, 6*b* as shown in FIG. 3 (*b*). The insulating layer 20 is then cut in a given shape, so that the FPC board 1 composed of the base insulating layer 2, the conductor layer 3 and the cover layers 6*a*, 6*b* is completed as shown in FIG. 3 (*c*).

While the conductor layer 3 is formed on the insulating layer 20 by lamination or etching in the example shown in FIGS. 2 and 3, the conductor layer 3 may be formed on the insulating layer 20 by another method such as sputtering, vapor deposition or plating. While the conductor layer 3 is formed by a subtractive method in the example shown in FIGS. 2 and 3, the conductor layer 3 may be formed by another method such as a semi-additive method. While the cover layers 6*a*, 6*b* are formed using an exposure method in the example shown in FIGS. 2 and 3, the cover layers 6*a*, 6*b* may be formed by another method. For example, the cover layers 6*a*, 6*b* in respective given patterns may be formed using a printing technique, and then subjected to thermal curing treatment.

The material for the base insulating layer 2 may be polyamide imide, polyethylene terephthalate, polyethylene naphthalate, polyphenylene sulfide, liquid crystal polymer, polyolefin or the like instead of polyimide. The material for the conductor layer 3 may be another metal such as silver or gold, an alloy containing a plurality of kinds of foregoing metal, or the like instead of copper.

(3) Fuel Cell Using the FPC Board

Figure 4:
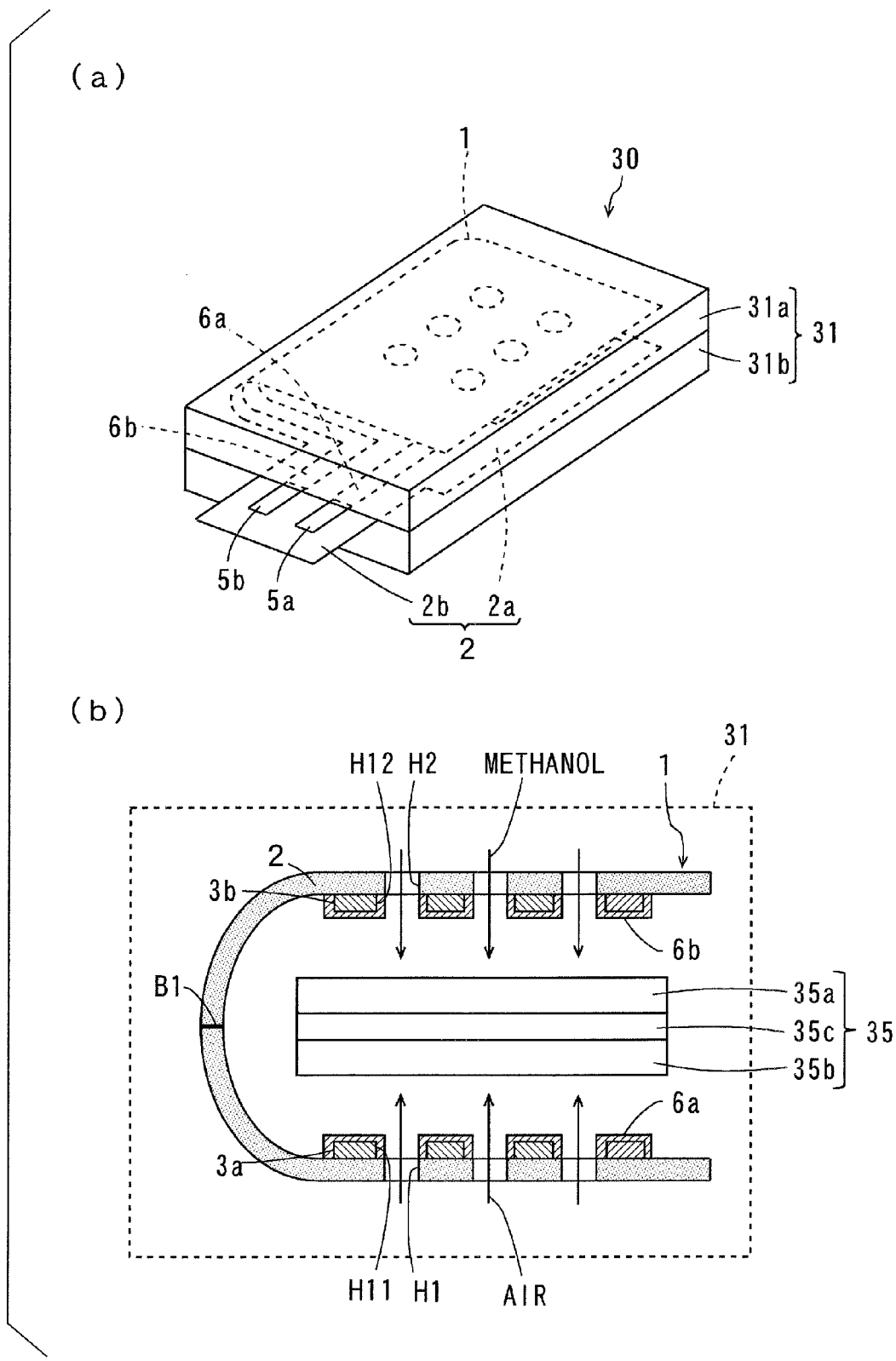
FIGS. 4 (a), (b) are diagrams showing the configuration of a fuel cell using the flexible printed circuit board of FIG. 1.

Next, description is made of a fuel cell using the above-described FPC board 1. FIG. 4 (*a*) is an external perspective view of the fuel cell using the FPC board 1, and FIG. 4 (*b*) is a diagram for illustrating actions in the fuel cell.

As shown in FIG. 4 (*a*), the fuel cell 30 includes a housing 31 having a rectangular parallelepiped shape and composed of half portions 31*a*, 31*b*. The FPC board 1 is sandwiched between the half portions 31*a*, 31*b* in the state where the base insulating layer 2 is bent along the bend portion B1 of FIG. 1 with its one surface on which the conductor layer 3 (FIG. 1) and the cover layers 6*a*, 6*b* are formed positioned on an inner side.

The second insulating portion 2*b* of the base insulating layer 2 of the FPC board 1 is drawn out from a clearance between the half portions 31*a*, 31*b*. Thus, the drawn-out electrodes 5*a*, 5*b* on the second insulating portion 2*b* are exposed in the outside of the housing 31. Terminals of various external circuits are electrically connected to the drawn-out electrodes 5*a*, 5*b*.

As shown in FIG. 4 (*b*), an electrode film 35 is arranged between the collector portion 3*a* and the collector portion 3*b* of the bent FPC board 1 inside the housing 31. The electrode film 35 is composed of a fuel electrode 35*a*, an air electrode 35*b* and an electrolyte film 35*c*. The fuel electrode 35*a* is formed on one surface of the electrolyte film 35*c*, and the air electrode 35*b* is formed on the other surface of the electrolyte film 35*c*. The fuel electrode 35*a* of the electrode film 35 is opposite to the collector portion 3*b* of the FPC board 1, and the air electrode 35*b* is opposite to the collector portion 3*a* of the FPC board 1.

The electrode film 35 and the FPC board 1 are spaced apart from each other in FIG. 4 (*b*); however, in practice, the fuel electrode 35*a* of the electrode film 35 is in contact with the cover layer 6*b* of the FPC board 1, and the air electrode 35*b* of the electrode film 35 is in contact with the cover layer 6*a* of the FPC board 1. In this case, the cover layers 6*a*, 6*b* each contain the conductive material, thus ensuring conductivity between the collector portion 3*b* and the fuel electrode 35*a* and between the collector portion 3*a* and the air electrode 35*b*.

A fuel is supplied to the fuel electrode 35*a* of the electrode film 35 through the openings H2, H12 of the FPC board 1. Methanol is employed as the fuel in the present embodiment. Air is supplied to the air electrode 35*b* of the electrode film 35 through the openings H1, H11 of the FPC board 1.

In this case, methanol is decomposed into hydrogen ions and carbon dioxide in the fuel electrode 35*a*, forming electrons. The formed electrons are led from the collector portion 3*b* to the drawn-out electrode 5*b* (FIG. 4 (*a*)) of the FPC board 1. Hydrogen ions decomposed from methanol pass through the electrolyte film 35*c* to reach the air electrode 35*b*. In the air electrode 35*b*, hydrogen ions and oxygen are reacted while the electrons led from the drawn-out electrode 5*a* (FIG. 4 (*a*)) to the collector portion 3*a* are consumed, thereby forming water. In this manner, electrical power is supplied to the external circuits connected to the drawn-out electrodes 5*a*, 5*b*.

(4) Effects of the Present Embodiment

When methanol used as the fuel reacts with oxygen, formic acid having a strong corrosive effect is formed in the fuel cell 30. When the formic acid comes in contact with the conductor layer 3 of the FPC board 1, the conductor layer 3 corrodes. In the FPC board 1 according to the present embodiment, the cover layers 6a, 6b are formed to cover the conductor layer 3, thus preventing the formic acid and the conductor layer 3 from coming in contact with each other.

However, if the formic acid enters clearances between the conductor layer 3 and the cover layers 6a, 6b, the formic acid may come into contact with the conductor layer 3, thus resulting in corrosion of the conductor layer 3. Therefore, the cover layers 6a, 6b are formed using the paste composition containing the added compound of the foregoing formula (1), thereby inhibiting the conductor layer 3 from corroding due to the formic acid in the FPC board 1 according to the present embodiment. The foregoing paste composition is considered to improve adhesion between the conductor layer 3 and the cover layers 6a, 6b, thus inhibiting entering of the formic acid. In addition, it is considered that protons that cause corrosion are captured by the amino group contained in the added compound.

(5) Inventive Examples and Comparative Examples

Figure 5:
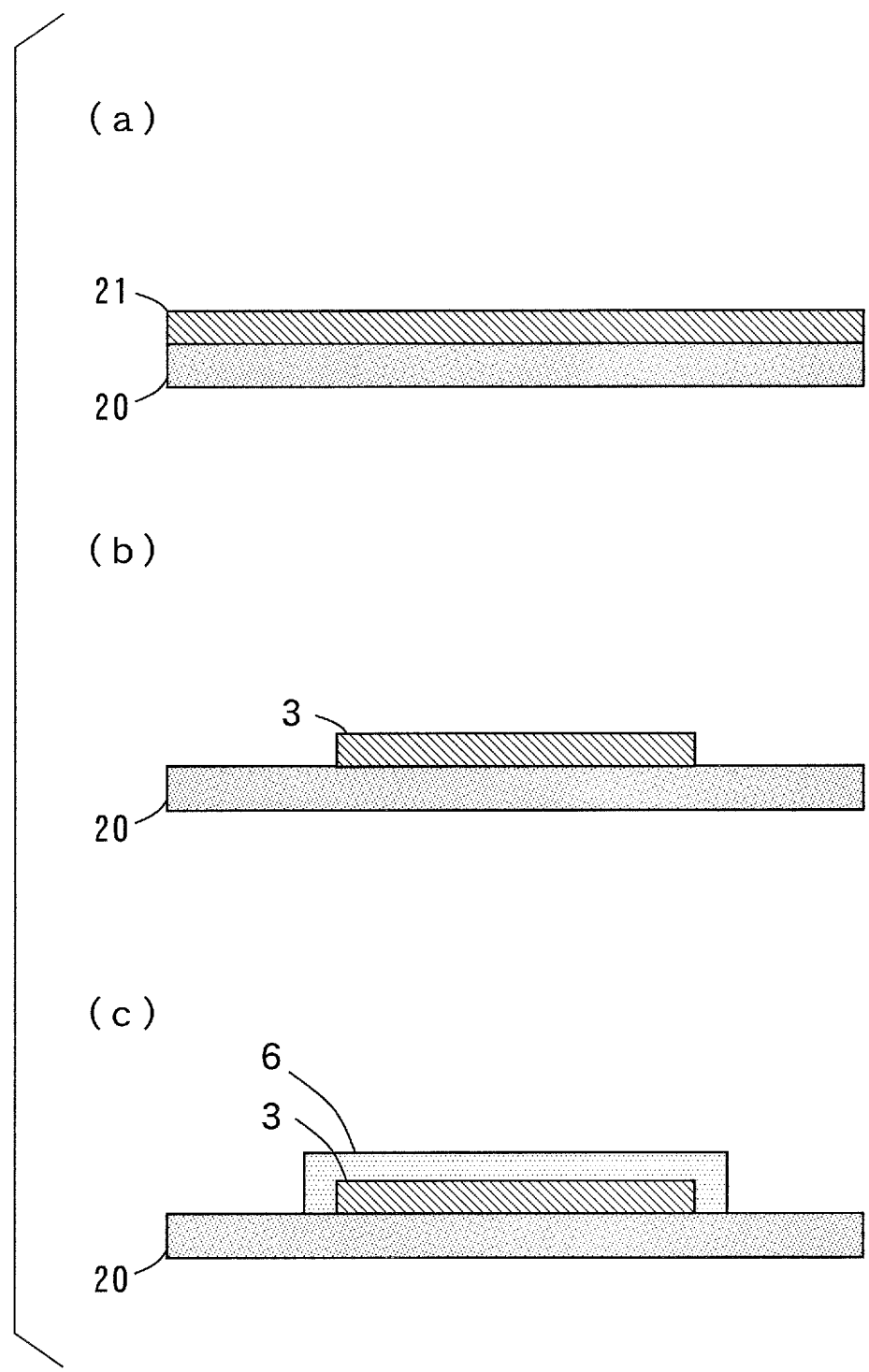
FIGS. 5 (a) to (c) are sectional views for use in illustrating steps in a method of manufacturing samples of inventive examples and comparative examples.

Samples of inventive examples 1 to 12 and comparative examples 1 to 3 were prepared as follows. FIG. 5 shows sectional views for use in illustrating steps in a method of manufacturing the samples of the inventive examples 1 to 12 and the comparative examples 1 to 3.

(5-1) The Inventive Example 1

75 parts by weight of dimethyl terephthalic acid, 40 parts by weight of dimethyl isophthalic acid, 80 parts by weight of ethylene glycol, 60 parts by weight of neopentyl glycol, and 0.1 part by weight of tetrabutyl titanate were put in a four neck flask having a Vigreux rectifying column, and ester exchange reaction was performed at 180° C. for three hours. Then, 2 parts by weight of trimellitic anhydride and 80 parts by weight of sebacic acid were added, and dehydration reaction was performed for one hour. Next, the pressure was gradually reduced to 1 mm HG or less, and polymerizing reaction was performed at 270° C. for two hours, so that polyester resin was obtained.

40 parts by weight of polyester resin and 100 parts by weight of diethylene glycol monoethyl ether acetate were subsequently put in a four neck flask, and dissolved at 80° C. After cooling to room temperature, 5 parts by weight of a block of hexamethylene diisocyanate (DURANATE by Asahi Kasei Chemicals Corporation) was added, so that binder resin (a resin material) was obtained. Then, 10 parts by weight of Ketjenblack (EC-DJ600 by Lion Corporation) as conductive carbon black, 45 parts by weight of graphite (by Nippon Graphite Industries, Co., Ltd.) and 45 parts by weight of the binder resin were mixed and then dispersed in a three roll kneader, so that a solution containing the resin material and the conductive material was obtained. 0.3 part by weight of 1H-tetrazole was added to the solution, so that the paste composition was obtained.

Meanwhile, the two-layer base material obtained by laminating the insulating layer 20 made of polyimide and the conductor layer 21 made of copper to each other was prepared as shown in FIG. 5 (a). Next, the conductor layer 21 was subjected to etching using ferric chloride, and the conductor layer 3 in the given pattern was formed as shown in FIG. 5 (b). After that, the foregoing paste composition was applied on the insulating layer 20 to cover the conductor layer 3, dried at 150° C. for 30 minutes to be cured, so that the cover layer 6 was formed as shown in FIG. 5 (c). In this manner, the sample of the inventive example 1 was obtained.

(5-2) The Inventive Example 2

The sample of the inventive example 2 was prepared in the same manner as in the inventive example 1 excluding that a paste composition was prepared using 5-phenyl-1H-tetrazole instead of 1H-tetrazole.

(5-3) The Inventive Example 3

The sample of the inventive example 3 was prepared in the same manner as in the inventive example 1 excluding that a paste composition was prepared using 5-methyl-1H-tetrazole instead of 1H-tetrazole.

(5-4) The Inventive Example 4

The sample of the inventive example 4 was prepared in the same manner as in the inventive example 2 excluding that the added amount of 5-phenyl-1H-tetrazole in a paste composition was 0.8 part by weight.

(5-5) The Inventive Example 5

The sample of the inventive example 5 was prepared in the same manner as in the inventive example 2 excluding that the added amount of 5-phenyl-1H-tetrazole in a paste composition was 0.15 part by weight.

(5-6) The Inventive Example 6

The sample of the inventive example 6 was prepared in the same manner as in the inventive example 2 excluding that the added amount of 5-phenyl-1H-tetrazole in a paste composition was 0.001 part by weight.

(5-7) The Inventive Example 7

The sample of the inventive example 7 was prepared in the same manner as in the inventive example 1 excluding that the added amount of 1H-tetrazole in a paste composition was 0.7 part by weight.

(5-8) The Inventive Example 8

The sample of the inventive example 8 was prepared in the same manner as in the inventive example 2 excluding that the cover layer 6 was formed using a paste composition prepared as follows.

10 parts by weight of Ketjenblack (EC-DJ600 by Lion Corporation) as conductive carbon black and 45 parts by weight of graphite (by Nippon Graphite Industries, Co., Ltd.) were mixed in 41 parts by weight of epoxy resin (composed of jER-1007 by Mitsubishi Chemical Corporation and EXA-4850 by DIC Corporation at a ratio of 50:50) dissolved in methylethylketone, and then dispersed in a three roll kneader, so that a dispersed liquid was obtained. Next, 3.3 parts by weight of acid anhydride (MH-700 by New Japan Chemical Co., Ltd.) as a curing agent and 0.8 part by weight of imidazole (2E4MZ by Shikoku Chemicals Corporation) as a catalyst were mixed in the obtained dispersed liquid, so that a solution containing the resin material and the conductive material was obtained. 0.3 part by weight of 5-phenyl-1H-tetrazole was added to the solution, so that the paste composition was obtained.

(5-9) The Inventive Example 9

The sample of the inventive example 9 was prepared in the same manner as in the inventive example 2 excluding that the cover layer 6 was formed using a paste composition prepared as follows.

36 parts by weight of resol-type phenolic resin (PHENO-LITE5010 by DIC Corporation), 9 parts by weight of bisphenol A type epoxy resin (jER-1007 by Mitsubishi Chemical Corporation), 10 parts by weight of Ketjenblack (EC-DJ600 by Lion Corporation) as conductive carbon black and 45 parts by weight of graphite (by Nippon Graphite Industries, Co., Ltd.) were mixed in ethyl carbitol, and then dispersed in a three roll kneader, so that a solution containing the resin material and the conductive material was obtained. 0.3 part by weight of 5-phenyl-1H-tetrazole was added in the solution, so that the paste composition was obtained.

(5-10) The Inventive Example 10

The sample of the inventive example 10 was prepared in the same manner as in the inventive example 2 excluding that the added amount of 5-phenyl-1H-tetrazole in a paste composition was 5 parts by weight.

(5-11) The Inventive Example 11

The sample of the inventive example 11 was prepared in the same manner as in the inventive example 2 excluding that the added amount of 5-phenyl-1H-tetrazole in a paste composition was 9 parts by weight.

(5-12) The Inventive Example 12

The sample of the inventive example 12 was prepared in the same manner as in the inventive example 2 excluding that the added amount of 5-phenyl-1H-tetrazole in a paste composition was 15 parts by weight.

(5-13) The Comparative Example 1

The sample of the comparative example 1 was prepared in the same manner as in the inventive example 1 excluding that a paste composition was prepared using 1-methyl-5-ethyl-1H-tetrazole instead of 1H-tetrazole.

(5-14) The Comparative Example 2

The sample of the comparative example 2 was prepared in the same manner as in the inventive example 1 excluding that a paste composition was prepared using 2,5-dimercapto-1,3,4-thiadiazole instead of 1H-tetrazole.

(5-15) The Comparative Example 3

The sample of the comparative example 3 was prepared in the same manner as in the inventive example 1 excluding that a paste composition was prepared without adding 1H-tetrazole therein.

(5-16) Evaluation

The samples of the inventive examples 1 to 12 and the comparative examples 1 to 3 were immersed in an aqueous solution containing formic acid at a concentration of 1000 ppm for seven days in an environment at 50° C., and the corrosion state of each conductor layer 3 was observed.

In addition, contact resistance of each of the samples of the inventive examples 1 to 12 and the comparative examples 1 to 3 was measured as follows before and after immersion in the foregoing formic acid aqueous solution. FIG. 6 is a schematic diagram showing a method of measuring the contact resistance.

As shown in FIG. 6, the samples of the inventive examples 1 to 12 and the comparative examples 1 to 3 were prepared in pairs. The cover layers 6 of each sample in a pair were overlapped with each other with a carbon paper CP sandwiched therebetween, and pressure was applied at 1 MPa in an environment of 25° C. In the state, a resistance value between the pair of conductor layers 3 of each sample was measured using AC mΩ HITESTER (Hioki E. E. Corporation).

Table 1 shows respective compositions of the paste compositions used in the inventive examples 1 to 12 and the comparative examples 1 to 3 and evaluation results of the corrosion states. Table 2 shows measurement values of the contact resistance in the inventive examples 1 to 12 and the comparative examples 1 to 3.

TABLE 1

| | | CONDUCTIVE MATERIAL | | COMPOUND | | | | | |
|---|---|---|---|---|---|---|---|---|---|
| | RESIN | | | 1H- | 5-PHENYL- | 5-METHYL- | 1-METHYL-5-ETHYL- | 2,5-DIMERCAPTO- | COR- |
| | MATERIAL | CARBON CLACK | GRAPHITE | TETRAZOLE | 1H-TETRAZOLE | 1H-TETRAZOLE | 1H-TETRAZOLE | 1,3,4-THIADIAZOLE | ROSION STATE |
| INVENTIVE EXAMPLE 1 | 45 | 10 | 45 | 0.3 | | | | | ○ |
| INVENTIVE EXAMPLE 2 | 45 | 10 | 45 | | 0.3 | | | | ○ |
| INVENTIVE EXAMPLE 3 | 45 | 10 | 45 | | | 0.3 | | | ○ |
| INVENTIVE EXAMPLE 4 | 45 | 10 | 45 | | 0.8 | | | | ○ |
| INVENTIVE EXAMPLE 5 | 45 | 10 | 45 | | 0.15 | | | | ○ |
| INVENTIVE EXAMPLE 6 | 45 | 10 | 45 | | 0.001 | | | | Δ |
| INVENTIVE EXAMPLE 7 | 45 | 10 | 45 | 0.7 | | | | | ○ |
| INVENTIVE EXAMPLE 8 | 45 | 10 | 45 | | 0.3 | | | | ○ |

TABLE 1-continued

| | RESIN MATERIAL | CONDUCTIVE MATERIAL | | COMPOUND | | | | | COR-ROSION STATE |
|---|---|---|---|---|---|---|---|---|---|
| | | CARBON BLACK | GRAPHITE | 1H-TETRAZOLE | 5-PHENYL-1H-TETRAZOLE | 5-METHYL-1H-TETRAZOLE | 1-METHYL-5-ETHYL-1H-TETRAZOLE | 2,5-DIMERCAPTO-1,3,4-THIADIAZOLE | |
| INVENTIVE EXAMPLE 9 | 45 | 10 | 45 | | 0.3 | | | | o |
| INVENTIVE EXAMPLE 10 | 45 | 10 | 45 | | 5 | | | | o |
| INVENTIVE EXAMPLE 11 | 45 | 10 | 45 | | 9 | | | | o |
| INVENTIVE EXAMPLE 12 | 45 | 10 | 45 | | 15 | | | | Δ |
| COMPARATIVE EXAMPLE 1 | 45 | 10 | 45 | | | | 0.3 | | x |
| COMPARATIVE EXAMPLE 2 | 45 | 10 | 45 | | | | | 0.3 | x |
| COMPARATIVE EXAMPLE 3 | 45 | 10 | 45 | | | | | | x |

TABLE 2

| | CONTACT RESISTANCE VALUE [mΩ] | |
|---|---|---|
| | BEFORE IMMERSION | AFTER IMMERSION |
| INVENTIVE EXAMPLE 1 | 24 | 25 |
| INVENTIVE EXAMPLE 2 | 22 | 24 |
| INVENTIVE EXAMPLE 3 | 25 | 25 |
| INVENTIVE EXAMPLE 4 | 23 | 24 |
| INVENTIVE EXAMPLE 5 | 22 | 22 |
| INVENTIVE EXAMPLE 6 | 24 | 550 |
| INVENTIVE EXAMPLE 7 | 21 | 24 |
| INVENTIVE EXAMPLE 8 | 19 | 23 |
| INVENTIVE EXAMPLE 9 | 23 | 24 |
| INVENTIVE EXAMPLE 10 | 22 | 23 |
| INVENTIVE EXAMPLE 11 | 21 | 26 |
| INVENTIVE EXAMPLE 12 | 24 | 420 |
| COMPARATIVE EXAMPLE 1 | 22 | 1835 |
| COMPARATIVE EXAMPLE 2 | 25 | 1455 |
| COMPARATIVE EXAMPLE 3 | 23 | 1634 |

As a result, the conductor layers 3 did not substantially corrode in the samples of the inventive examples 1 to 5 and 7 to 11. The conductor layers 3 slightly corroded in the samples of the inventive examples 6, 12. Meanwhile, almost entire regions of the conductor layers 3 corroded in the samples of the comparative examples 1 to 3.

Moreover, in the samples of the inventive examples 1 to 5, 7 to 11, there was almost no change in the contact resistance before and after the immersion in the formic acid aqueous solution. In the samples of the inventive examples 6, 12, the contact resistance after the immersion in the formic acid aqueous solution was about 20 times as large as the contact resistance before the immersion in the formic acid aqueous solution. In the samples of the comparative examples 1 to 3, the contact resistance after the immersion in the formic acid aqueous solution was about 60 to 80 times as large as the contact resistance before the immersion in the formic acid aqueous solution.

This indicates that forming the cover layers 6a, 6b using the paste composition containing the added compound represented by the foregoing formula (1) inhibits the conductor layers 3 from corroding. In addition, it was found that the ratio of the added compound to the paste composition was not less than 0.14 part by weight and not more than 9 parts by weight when it is assumed that the resin material, the conductive material and the added compound are 100 parts by weight in total, so that the conductor layers 3 were more sufficiently inhibited from corroding.

(6) Other Embodiments

While the conductive material is contained in the entire cover layers 6a, 6b in the foregoing embodiment, the conductive material may be contained in only parts of the cover layers 6a, 6b if the conductivity between the collector portion 3b and the fuel electrode 35a and between the collector portion 3a and the air electrode 35b can be ensured. For example, the conductive material may be contained in portions of the cover layers 6a, 6b above the collector portions 3a, 3b, and the conductive material may not be contained in portions of the cover layers 6a, 6b above the drawn-out conductor portions 4a, 4b.

The conductive material may not be contained in the cover layers 6a, 6b if the conductivity between the collector portion 3b and the fuel electrode 35a and between the collector portion 3a and the air electrode 35b can be ensured and the conductor layer 3 can be prevented from corroding due to formic acid. The conductive material may not be contained in the cover layers 6a, 6b when the cover layers 6a, 6b are provided such that parts of the collector portions 3a, 3b are exposed and a high corrosion resistance material such as gold is used in the exposed parts of the collector portions 3a, 3b, for example. In this case, the conductor layer 3 can be prevented from corroding due to formic acid without using an expensive material such as gold.

While the paste composition containing the added compound of the foregoing formula (1) is employed as the material for the cover layers 6a, 6b of the FPC board 1 used in the fuel cell 30 in the foregoing embodiment, the paste composition containing the added compound of the foregoing formula (1) may be used for other uses. For example, in solar batteries (particularly, dye-sensitized solar batteries), lithium ion batteries or the like, the paste composition containing the added compound of the foregoing formula (1) can be employed for protecting a conductor layer, which is utilized for collecting electricity, from a chemical solution, an electrolytic solution or the like.

As each of various elements recited in the claims, various other elements having configurations or functions described in the claims as well as the elements described in the embodiments can be also used.

While preferred embodiments of the present invention have been described above, it is to be understood that variations and modifications will be apparent to those skilled in the art without departing the scope and spirit of the present invention. The scope of the present invention, therefore, is to be determined solely by the following claims.

INDUSTRIAL APPLICABILITY

The present invention can be effectively utilized for fuel cells, solar batteries, lithium ion batteries or the like.

We claim:

1. A paste composition containing:
a thermosetting polymer; and
a compound represented by the following formula (1) where R1 is a hydrogen atom, an alkyl group with carbon number 1 to 14, a phenyl group, an amino group, a mercapto group, an aromatic series-containing functional group, an alkoxy group, an alkylamino group or an alkoxycarbonyl group; and

[Formula 1]

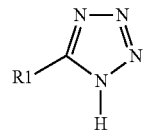

(1)

a conductive material, wherein
the conductive material ensures that the paste composition is electrically conductive.

2. The paste composition according to claim 1, wherein said conductive material contains at least one of carbon black, graphite, carbon nanotube, carbon fiber, gold and silver.

3. The paste composition according to claim 1, wherein a ratio of said compound is not less than 0.01 part by weight and not more than 10 parts by weight when said compound, said thermosetting polymer and said conductive material are 100 parts by weight in total.

4. The paste composition according to claim 1, wherein said thermosetting polymer contains at least one of phenolic resin, epoxy resin and polyester resin.

5. A printed circuit board comprising:
an insulating layer;
a conductor layer provided on said insulating layer and having a given pattern; and
a cover layer formed to cover at least part of said conductor layer, wherein
said cover layer contains the paste composition according to claim 1.

* * * * *